Figures 1, 2:
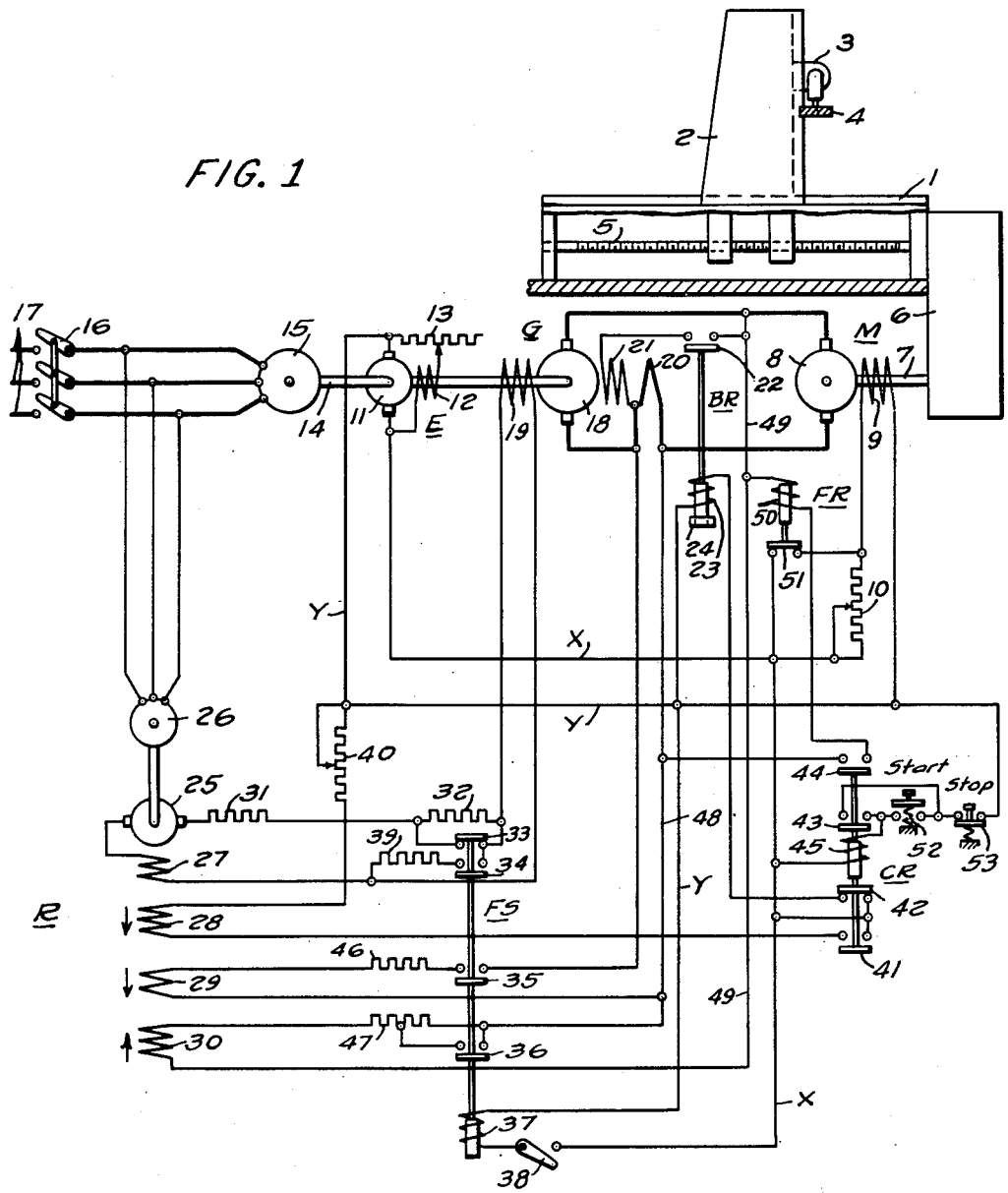

June 6, 1950  G. E. KING ET AL  2,510,637
VARIABLE VOLTAGE MOTOR DRIVE
Filed Aug. 15, 1944

WITNESSES:
E. G. McCloskey
Curt M. Avery

INVENTORS
George E. King and
William H. Formhals.
BY Paul E. Friedemann
ATTORNEY Patented June 6, 1950

2,510,637

UNITED STATES PATENT OFFICE 2,510,637

VARIABLE VOLTAGE MOTOR DRIVE

George E. King, Swissvale, and William H. Formhals, Forest Hills, Pa., assignors to Westinghouse Electric Corporation, East Pittsburgh, Pa., a corporation of Pennsylvania Application August 15, 1944, Serial No. 549,572

6 Claims. (Cl. 318—143)

Our invention relates to electric drives of the variable voltage type for operating machine tools and other machinery at stable speeds of selective magnitude.

Such variable speed drives are equipped with a direct-current motor which is energized by a variable voltage (main) generator whose field excitation is controlled and regulated in accordance with the desired motor speed. It is known to provide an auxiliary generator, acting as a sensitive amplifier, for effecting the just-mentioned control and regulation of the main generator field excitation; and it is this latter type of two-generator systems to which the present invention is particularly directed.

It is an object of the invention to provide a variable voltage drive which is capable of operation over an extremely wide total range of stable operating speeds without requiring an unwieldly amount of auxiliary equipment and without tending to develop excessive hunting at any operating speed within the available total range. For instance, the tool drive motors used on boring and milling machines and planers for operating milling cutters, boring bars, shaping rams or other cutting tools, and also the feed motors for advancing the workpiece relative to the tool in such machines, are often required to permit a speed selection within a total range of 1 to 100 or 120 and more, and it is intended by this invention to afford such a selection by relatively simple and highly reliable electric control means while securing a sufficiently stable operation at any selected speed largely independent of irregularities in motor load.

Another object of the invention, allied to the foregoing, is to devise a variable voltage drive, equipped with an auxiliary generator as aforementioned, which permits adjusting the motor speed down to very low values of, say, about 15 to 18 rotations per minute and preventing the regulatory function of the auxiliary generator from causing the excessive overcorrection and hunting tendency apt to occur in drive systems that are also designed for regulated speeds of much higher magnitude such as in the order of 1800 R. P. M.

In order to achieve these objects, we design a variable voltage drive, having a main generator controlled and regulated by an auxiliary or regulating generator, in such a manner that it has a plurality of selective speed ranges, the motor speed being adjustable within the limits of each range; and we provide for such a range selection by changing the over-all amplification factor of the regulating generator circuit so that the effective amplification obtaining in a range of higher motor speeds is larger than the amplification in a lower speed range. That is, the regulating generator represents a sensitive amplifier which converts a variable (primary) input energy supplied to its field windings into a much greater (secondary) output energy which changes substantially proportionately with the field input energy and is imposed on the main generator for controlling and regulating the voltage generated by the latter. Hence, what we propose to do according to the above-mentioned feature of our invention is to reduce the ratio of field input or primary energy to utilized output energy when the drive system is to operate within a low speed range, while we increase this ratio (amplification factor) when adjusting the system for a higher range of motor speeds. The regulating generator has usually one or several control field windings whose exciting circuits are responsive to the voltage, current or other condition of the motor circuit in order to cause the regulating generator to perform its stabilizing regulating function; and it is also a feature of the invention, in conjunction with the one above-mentioned, to recalibrate this or these regulator exciting circuits when changing from one to another speed range. According to another related feature, a single operator-actuable control switch is preferably provided for effecting the recalibration together with, and in proper correlation to, the change in amplification.

According to a further feature of the invention, the selection of speed range and change of amplification is effected by controllable resistance means which are located between the armature of the regulating generator and a field winding of the main generator, so that the proportion of the energy output of the regulator armature supplied to the main generator field winding is reduced when the system is adjusted to a lower speed range, while a larger proportion or all of the regulator armature output is utilized in the main generator field winding when operating in a high speed range.

According to still another feature of the invention, the regulating generator is provided with a field winding (pattern field winding), in addition to the regulatory field means above-mentioned, which is energized by constant voltage of selective magnitude, and an adjustable rheostat or other impedance member is provided in the circuit of this winding for selecting the voltage magnitude and thereby the desired speed within each of the available speed ranges.

In order to elucidate these features and for describing in detail a drive system designed and operative in accordance with our invention, reference is had to the diagrammatic illustration of the machine tool drive shown in the drawing in which Figure 1 represents a circuit diagram of the drive, while Fig. 2 shows a detail of the system in a modified form.

The machine tool shown in the drawing is a boring, milling and planing unit whose head 1 carries a horizontally displaceable standard or saddle structure 2. A ram 3 is guided on structure 2 for vertical motion and forms a guide for a tool carrier which is horizontally displaceable in the direction perpendicular to the plane of illustration. The appertaining tool is exemplified by a milling cutter 4. The saddle structure 2 engages a feed screw 5 which is driven by means of a gear or transmission, housed in a box 6, whose input shaft 7 is operated by a variable voltage drive which will be described in detail hereinafter.

The saddle structure 2 is provided with a ram feed motor for moving the ram 3 up and down. The ram is equipped with a motor for displacing the tool horizontally and a further drive motor may be provided for rotating the tool. These additional drive motors may form part of separate variable voltage drive systems similar to the one referred to hereinafter, and since these other drives operate independently of one another they are not represented in the drawing.

Shaft 7 is connected to the armature of a direct-current motor M. This motor has a field winding 9 connected through a speed adjusting rheostat 10 with a source of direct current of substantially constant voltage. This source, in the illustrated embodiment, comprises two mains X and Y which are energized by an exciter generator E. The armature of the exciter is denoted by 11 and the appertaining field winding by 12. The field winding is shunt-connected and includes in its circuit a rheostat 13 whose calibration need not be changed during the operation of the system. The armature 11 of exciter E is mounted on the shaft 14 of a main generator G. Shaft 14 is driven by a constant speed motor 15 consisting, for instance, of a synchronous motor, which is energized through a main switch 16 from an alternating current line 17.

The armature 18 of the main generator G is connected across armature 8 of the motor M in order to provide energization of variable voltage for the motor. The magnitude of this voltage and hence the speed of motor M are controlled by a separately excited field winding 19 of generator G. The generator G has preferably, but not necessarily, an interpole or compensating field winding 20. This winding is series-connected in the armature circuit of generator G and motor M and hence traversed by the load current of the motor. A shunt field winding 21 of generator G is connected across the motor armature 8 under control by the contact 22 of relay BR. The winding 21 is so arranged that, when its circuit is closed, it produces a magnetomotive force which decreases or kills the generated armature voltage. Relay BR, whose control coil is denoted by 23, has a short circuited winding 24 which secures a time-delayed operation so that contact 22 opens the circuit of winding 21 only upon elapse of a given timing period after the de-energization of coil 23.

The excitation of the main generator field winding 19 is controlled and regulated by a regulating generator R. The armature 25 of this generator is driven at constant speed by a motor 26 which is connected with the above-mentioned switch 16 so as to operate simultaneously with motor 15. The regulating generator R has a self-excited field circuit which includes the winding 27, and it has also three separately excited field windings 28, 29 and 30. The field winding 27 is here shown as a series-field winding although a shunt-connected winding may be employed instead. Winding 27 is connected in the output circuit of the regulator armature 25 in series connection with two calibrating resistors 31 and 32. This armature circuit is connected to field winding 19 of generator G. Resistor 32 is provided with a short-circuiting path under control by the contact 33 of a relay FS. This relay is equipped with three further contacts 34, 35 and 36 which are controlled by the relay coil 37. The energizing circuit of this coil extends between mains X and Y through a speed selector switch 38. As will be apparent hereinafter, the drive system is adjusted for a high speed range of motor M when switch 38 is open and relay FS de-energized, and is set for a range of lower speeds when switch 38 is closed and relay FS energized. Contact 34 of relay FS controls the connection of a resistor 39 so that this resistor lies across the armature circuit of regulator R when relay FS is energized while at the same time the short circuit of resistor 32 is eliminated so that the latter resistor is also effective in the armature circuit.

The field winding 28 of the regulator R, hereinafter referred to as the pattern field winding, is connected across mains X and Y through a speed adjusting rheostat 40 and the contact 41 of a control relay CR. Relay CR has three further contacts 42, 43 and 44 controlled by a coil 45. Contact 42 serves to complete an energizing circuit for the above-mentioned break relay BR when relay CR is deenergized. Contact 43 is a self-sealing contact and contact 44, when relay CR is energized, closes an energizing circuit for a motor field relay FR whose purpose will be referred to in a later place.

Field winding 29 is connected to the motor load circuit in order to measure the lead current, to this end, in the illustrated example, winding 29 lies across the above-mentioned compensating winding 20 of the main generator G although it will be understood that any other circuit-measuring connection may be used instead. The connection includes a calibrating resistor 46 and is controlled by contact 35 of relay FS. Since the voltage drop across winding 20 is a measure of the load current of motor M, the excitation of regulator winding 29, when operative, varies also in proportion to the motor load current or motor torque. Regulator field winding 30 is connected across motor armature 8 my conductors 28 and 48 and through a calibrating resistor 47 whose effective magnitude is controlled by contact 36 of relay FS. The excitation of winding 30 varies in accordance with the voltage impressed on the drive motor and hence in accordance with the motor speed.

In order to perform the intended control and regulating functions, the field windings of the regulating generator R are designed and rated in the following manner. The regulator operates on the straight-line portion of its characteristic and hence represents an amplifying device which changes a high magnitude of output energy substantially in proportion to the changes of a low input or field exciting energy. This amplifying function is increased and sensitized by the effect of the winding 27. The resistance of the armature circuit including the field winding 27 is so calibrated that its resistance line is coincident with or slightly above or below the no-load saturation characteristic of the regulating generator. As a result, the self-excited field circuit is incapable of building up the armature voltage of regulator R, but tends to maintain this voltage at the value determined by the other field windings of the regulator without coaction from these other fields.

The pattern field winding 28 represents the main control organ of the regulating generator. That is, the excitation of this winding determines essentially the stable value of voltage generated by armature 18 of main generator G and hence the selected speed at which the motor M is to operate. The two field windings 29 and 30 are designed for mutually differential action. That is, their field effects oppose each other and are balanced when the voltage or speed measured by winding 30 has the desired value while at the same time the load current or torque of the motor, measured by winding 29, has the correct value. Hence, when the drive operates under steady-state conditions at the desired speed and load, the fields of windings 29 and 30 cancel each other so that the armature voltage of regulator R and hence the excitation of the main generator field winding 19 are determined only by the selected setting of the speed regulating rheostat 40 within the speed range chosen by means of switch 38.

The field relay FR has its coil 50 connected across the motor armature 8 under control by contact 44 of relay CR. The contact 51 of field relay FR lies in a short-circuiting path across the speed adjusting rheostat 10 in the circuit of the motor field winding 9. Relay CR is controlled by a start button 52 and a stop button 53. Relay coil 50 is so rated that it does not open the appertaining contact 51 unless its energizing voltage exceeds a given value. This value lies close to the maximum generator voltage. Consequently, contact 51 remains closed at all motor speeds within the lower speed range and opens only when the selector switch 38 is open, i. e. set for the high speed range, and when further the speed adjusting rheostat 40 in the regulator pattern field circuit is set for a speed close to the maximum value. After the opening of contact 51, and only then, is the speed adjusting rheostat 10 in the motor field circuit effective and permits reducing the field strength in the motor in order to obtain a further increase in motor speed. The speed adjusting rheostat 40 is designed, for instance, for varying the speed of motor M from the lowest value up to fifty times this value, while the rheostat 10 in the motor field circuit permits a further increase in voltage for instance up to twice the maximum value adjustable by means of the rheostat 40. For example, if the lowest stable motor speed is 18 R. P. M., the adjusting rheostat 40, with selector switch 38 closed, permits rasing the speed to 127 R. P. M.; and when the selector switch 38 is open, the same rheostat 40 can be adjusted for speeds from 127 to 900 R. P. M. Thereafter, the rheostat 10 permits a further increase up to 1800 R. P. M. The sliders of rheostats 40 and 10 are preferably interlocked by mechanical means so that the voltage of generator G must be raised to its maximum value before the further actuation of the speed control means causes a weakening of the motor field.

It will be recognized from the just-mentioned example that one and the same rheostat 40 is used for adjusting the motor speed within each of the two available speed ranges. Hence the rheostat dial may be provided with double markings relating to these two ranges respectively. The modification shown schematically in Fig. 2 illustrates the just-mentioned details. In Fig. 2, the slider of rheostat 10 is denoted by 55, and the slider of rheostat 40 by 56. Both sliders are interconnected by a carrier which is mounted on a shaft 57 and provided with two pointers 58 and 59. A scale 60 arranged adjacent to pointer 58 indicates the speeds of the lower speed range, for instance, from 127 to 900 R. P. M. A scale 61 located adjacent to pointer 59 indicates the speeds of the higher range, for instance, from 900 to 1800 R. P. M. When the shaft 57 is revolved in the direction of the arrow marked A, the slider 56 diminishes the resistance of rheostat 40 to the zero value before the slider 55 starts increasing the resistance of rheostat 10, as explained in the foregoing.

The drive system as a whole operates in the following manner. Closure of switch 16 places the main generator G and the regulating generator R in operative condition so that the exciter mains X and Y are energized by constant voltage. This voltage is impressed on coil 23 of brake relay BR through contact 42 of relay CR. Consequently, contact 22 is closed. At this stage, the generator G generates no driving voltage because the energizing circuit of pattern field winding 28 is interrupted at contact 41 so that the regulating generator supplies no field excitation to the main generator field winding 19. Let us assume that the speed range selector 38 is closed so that the system is set for low speed operation. Then coil 37 of relay FS is energized thereby closing the energizing circuit of the current-responsive field winding 29 and calibrating the circuit of the voltage-responsive winding 30 for low speed operation. At the same time the resistor 39 is connected across field winding 19, and the resistor 32 is also effective.

In order to start the motor, the start button 52 is actuated. This energizes coil 45 of relay CR. As a result, the self-sealing contact 43 is closed, thereby maintaining relay CR picked up as long as the stop contact 53 is not opened. Relay CR, by closing its contact 41, energizes the pattern field winding 28 by a voltage which corresponds to the speed setting of rheostat 40. Hence, now the regulator armature 25 produces an output voltage and thereby causes the main generator G to energize motor M, and the motor will now run at the speed selected by the speed regulating rheostat 40. The circuit of coil 23 is now interrupted at contact 42 so that relay BR drops off and opens, at 22, the circuit of the "suicide" field winding 21 of generator G. As explained previously, the differentially acting field windings 29 and 30 of regulator R have now the effect of maintaining the motor voltage at the value necessary for an operation under stable speed and load conditions. If these conditions are as desired, the differential field effect of windings 29 and 30 is zero. If the motor operation departs from the desired condition, the differential field effect assumes a positive or negative magnitude in accordance with the direction and magnitude of the departure. This differential field imposes a corrective effect on the regulator output voltage tending to re-establish the desired conditions of motor operation. During this low speed operation, the resistors 32 and 39, connected with the armature circuit of the regulator, reduce the proportion of energy supplied by the regulator to the main generator field winding 19, thereby reducing the over-all amplification between the field input energy of the regulator and the amplified energy effective in the main generator field winding 19.

When the selector switch 38 is opened in order to set the system for high speed operation, the relay FS is de-energized so that the two resistors 32 and 39 are rendered ineffective. Consequently, at these higher speeds the proportion of regulator output energy supplied to the main generator field winding 19 is increased to a higher value as determined by the calibration of resistor 31. In other words, the over-all amplifying effect of the regulating generator circuit is increased when adjusting the system for the higher speed range. At this setting of switch 38, the circuit of the current-responsive regulator field winding 29 is interrupted and the circuit of the voltage-responsive regulator field winding 30 is recalibrated by increasing the effective resistance value of resistor 47. In this manner the corrective field means of the regulator are readjusted to the changed resistance conditions of the regulator armature circuit.

It will be understood from the foregoing that the various resistors must be rated in accordance with the desired speed value of the available speed ranges, for instance, in such a manner that the lowest speed of the higher speed range is substantially identical with the highest speed of the lower range and that, as exemplified in the foregoing, both ranges are substantially equal. While in the illustrated example the current responsive field winding 29 is ineffective in the lower speed range, it is also possible to provide for a recalibration of this circuit in a manner similar to the recalibration of the voltage responsive circuit of regulator field winding 30.

The function and requirements of the above described change in amplification factor and recalibration of the regulatory circuits will be more fully understood from the following consideration.

In a control and regulating system of the type here concerned, the maximum corrective power of the regulating generator is equal to the difference between the maximum available output power of this generator and the excitation required for the main generator field 19. Or, expressed differently, the maximum power to be provided by the regulating generator is equal to the maximum excitation needed for the main generator field winding plus the required maximum corrective power. It follows that at lower motor speeds, corresponding to low values of excitation of the main generator field winding, an enormous corrective power as compared with this excitation would be available if the amplification characteristic and the regulating means were not changed. Under such an excessive corrective power, a change in the motor load or other operating constants might cause a considerable overcorrection which in turn tends to produce violent hunting. Due to the fact, however, that the total range of available speeds is subdivided into a plurality of speed ranges correlated to a corresponding adjustment and calibration of the regulating generator circuits, the change of speed or voltage occurring within each individual range is limited to a reasonable value with respect to the then adjusted operating condition of the regulating system. As stated before, this is achieved by changing the constants in the regulator armature and main generator field circuit so that only a portion of the regulator output is useful in the generator field winding at low values of speed or generator field excitation, while the various fields of the regulator are recalibrated whenever the setting is changed from one to another speed range. In this way the percentage of corrective power to excitation power is kept within such limits that a substantially stable operation of the drive system is secured.

While we have illustrated a control system whose regulating generator involves a double stage amplification due to the feedback feature of its self-energized field circuit, it will be understood from the foregoing explanation that regulating generators of different types may also be employed. For instance, a self-energized field circuit may be omitted so as to operate with a single-stage amplification, or a different type of double-stage amplifying generator may be used, without substantially affecting the control and regulating operation of the system as a whole. We are mentioning these possibilities of modification without illustrating or claiming them specifically in order to indicate that the invention permits of various alterations without departure from its gist and essential features as set forth in the claims annexed hereto.

We claim as our invention:

1. A variable voltage drive comprising a drive motor, a main generator having an armature connected to said motor for supplying it with voltage of variable magnitude for controlling its speed, said main generator having a field winding for controlling said voltage, an amplifying regulating generator having an armature circuit connected with said main generator field winding for providing controlled excitation therefor, said regulating generator having a self-excited field circuit connected with said armature circuit, a pattern field winding and two mutually opposing and balanceable field windings, energizing circuit means connected to said pattern field winding and including adjustable resistance means for exciting said pattern field winding by voltage of selective magnitude so as to thereby adjust the speed of said motor, circuit means connected with one of said balanceable field windings for exciting it in dependence upon the magnitude of said voltage, and further circuit means connected with said other balanceable winding for exciting it in dependence upon the load current of said motor, a first resistor connected with said armature circuit, speed-range selector means connected with said resistor for controlling said resistor to change the proportion of armature output of said regulating generator supplied to said main generator field winding so that a smaller part of said output is effective at a range of lower motor speeds than at higher speeds, a second resistor associated with said self-excited field circuit and controlled by said speed-range selector means so as to maintain substantially the same self-excitation regardless of the selected adjustment of said selector means, and a third resistor associated with at least one of said two circuit means and controlled by said selector means for changing the resistance calibration of said circuit means in dependence upon the selected adjustment of said selector means.

2. A variable voltage drive comprising a drive motor, a main generator having an armature connected to said motor for supplying it with voltage of variable magnitude for controlling its speed, said main generator having a field winding for controlling said voltage, a regulating generator having an armature circuit connected with said main generator field winding for providing controlled excitation therefor, said regulating generator having a pattern field winding and two mutually opposing and balanceable field windings, energizing circuit means connected to said pattern field winding and including adjustable impedance means for exciting said pattern field winding by voltage of selective magnitude so as to thereby adjust the speed of said motor, circuit means connected with one of said balanceable field windings for exciting it in dependence upon the magnitude of said voltage, circuit means connected with said other balanceable winding for exciting it in dependence upon the load current of said motor, first resistance means connected with said armature circuit, speed-range selector means connected with said first resistance means for controlling it so that the proportion of armature output of said regulating generator passing through said main generator field winding is lower at a selected low speed range than at a selected high speed range, and second resistance means connected with at least one of said two circuit means and connected to said selector means so as to be controlled by said selector means to change the resistance calibration of said circuit means in dependence upon the selected speed range.

3. A variable-voltage control system, comprising a controlled circuit member, an amplifying generator rated for operation substantially limited to the unsaturated and linear portion of its magnetization characteristic and having an armature for generating variable control voltage for said circuit member, said amplifying generator having separately excited field means for controlling said voltage and having a self-excited field circuit series-connected with said member across said armature, first resistance means series-connected in said field circuit, second resistance means connected in said field circuit in shunt relation to said member, and a selectively operable contactor movable between two positions and having two contact means, one of said contact means being connected with said first resistance means to adjust its resistance between low and high values respectively when said contactor is moved from one to the other position, said other contact means being connected with said second resistance means to adjust its resistance between high and low values respectively when said contactor is moved from said one to said other position, said circuit being closed in both positions of said contact means, and said two resistance means being rated to adapt the resistance line of said field circuit to approximate coincidence with said linear portion of said characteristic in each of said two positions of said contact means.

4. A variable-voltage control system, comprising a controlled circuit member, an amplifying generator rated for operation substantially limited to the unsaturated and linear portion of its magnetization characteristic and having an armature for generating variable control voltage for said circuit member, said amplifying generator having separately excited field means for controlling said voltage and having a self-excited field circuit series-connected with said member across said armature, a first resistor series-connected in said field circuit, a second resistor connected in said field circuit in shunt relation to said member, selectively operable control means movable between two positions and having two contacts for controlling said respective resistors so as to make both resistors effective in said circuit when said control means is in one of said positions and making both resistors ineffective when said control means is in said other position, said field circuit being closed in both positions of said control means and having in both said positions a resistance line approximately coincident with said linear position of said characteristic.

5. A variable voltage drive, comprising two dynamos to operate as motor and generator respectively, said dynamos having respective armatures, a loop circuit interconnecting said armatures, a field winding on one of said dynamos for controlling the motor speed, an amplifying generator rated for operation within the unsaturated and substantially linear portion of its saturation characteristic and having an armature to generate variable voltage, an armature circuit connecting said latter armature with said field winding for impressing thereon a voltage drop proportional to said control voltage, said amplifying generator having a self-excitation winding connected with said armature circuit and separately excited field means connected with said loop circuit for controlling said variable voltage in dependence upon an electric condition of said loop circuit, a first resistor disposed in said armature circuit in series relation to said dynamo field winding, a second resistor disposed in said armature circuit in shunt relation to said dynamo field winding, a speed range selector having contact means selectively movable between high-speed and low-speed positions respectively and connected with said resistors for controlling them in a given relation to one another so that said resistors are effective in said armature circuit only when said contact means are in said low-speed position, said armature circuit being closed in both positions of said contact means, and said self-excitation winding having in both positions of said contact means a resistance line approximately coincident with said portion of said saturation characteristic.

6. A variable voltage drive according to claim 5, comprising a controllable resistance means connected between said separately excited field means and said loop circuit, and said contact means of said speed range selector being connected with said resistance means for controlling the latter dependent upon the selected position of said contact means.

GEORGE E. KING.
WILLIAM H. FORMHALS.

REFERENCES CITED

The following references are of record in the file of this patent:

UNITED STATES PATENTS

| Number | Name | Date |
| --- | --- | --- |
| 2,221,584 | King | Nov. 12, 1940 |
| 2,255,064 | King | Sept. 9, 1941 |
| 2,255,488 | Huston | Sept. 9, 1941 |
| 2,278,519 | King et al. | Apr. 7, 1942 |
| 2,295,395 | Formhals | Sept. 8, 1942 |
| 2,301,689 | Edwards | Nov. 10, 1942 |
| 2,372,075 | Formhals | Mar. 20, 1945 |